Jan. 29, 1924.
L. T. THORN
1,481,937
LICENSE PLATE HOLDER
Filed March 27, 1923
2 Sheets-Sheet 1
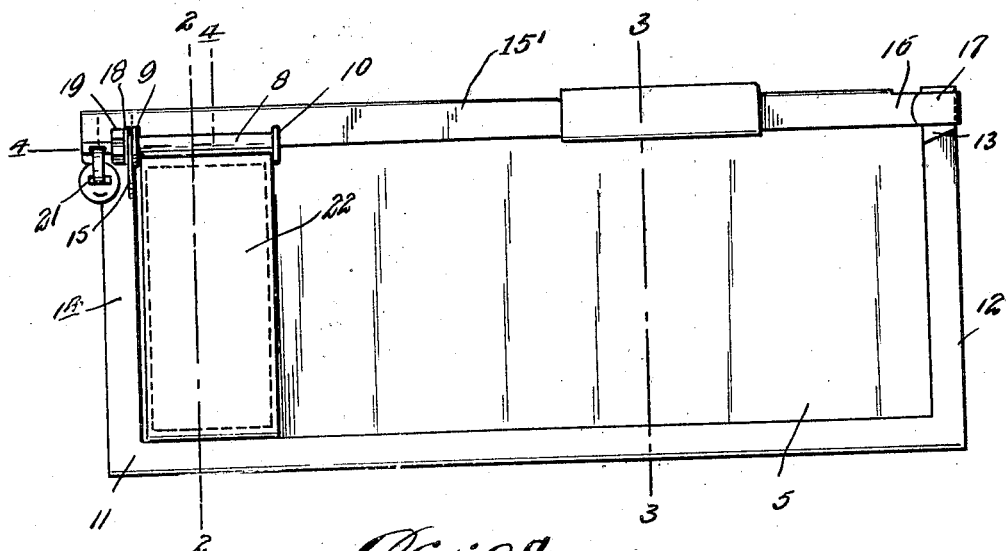
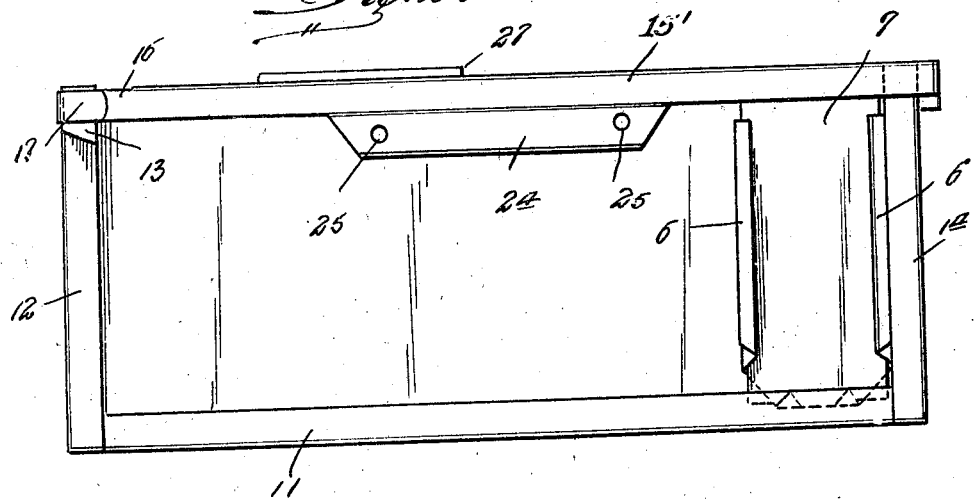
Witnesses:
Lawrence T. Thorn,
Inventor

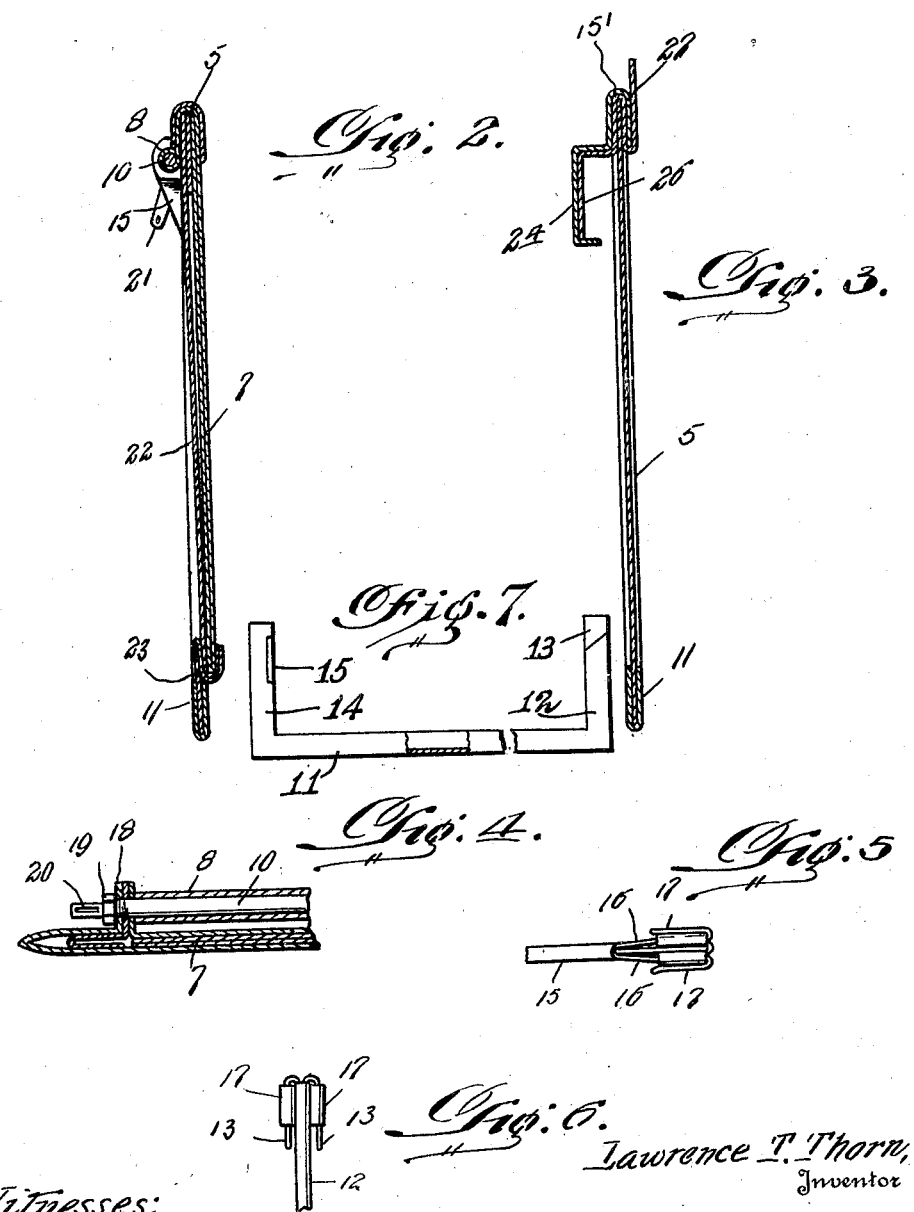

Patented Jan. 29, 1924.

1,481,937

UNITED STATES PATENT OFFICE.

LAWRENCE T. THORN, OF HARRISBURG, ARKANSAS.

LICENSE-PLATE HOLDER.

Application filed March 27, 1923. Serial No. 628,111.

*To all whom it may concern:*

Be it known that I, LAWRENCE T. THORN, a citizen of the United States, residing at Harrisburg, in the county of Poinsett and State of Arkansas, have invented certain new and useful Improvements in License-Plate Holders, of which the following is a specification.

My invention relates to an improvement in license plate holders that is primarily, but not specifically, adapted for holding a license plate shown and described in my copending application, filed February 26th, 1923, and bearing Serial Number 621,251.

The main purpose of my invention is the provision of such a license plate holder, wherein the license plate is adapted to be sealed therein, means being provided upon the holder for securing the same to the body of the motor vehicle for absolutely preventing the removal of the same therefrom without breaking or otherwise marring this seal.

A further purpose of my invention is the provision of such a license plate holder that is adapted to have the serial number of a vehicle motor applied thereto, which will effect one means for lessening the liability of a car being stolen, my invention being further characterized by its simplicity and rigidness of construction and substantial inexpensiveness of manufacture.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figures 1 and 2ª are front and rear elevations, respectively, of my improved license plate holder, the same being shown as having a license plate associated therewith.

Figures 2, 3 and 4 are detail cross sections upon the lines 2—2, 3—3, and 4—4, respectively, of Figure 1.

Figure 5 is a top plan view of one end of my holder.

Figure 6 is an end elevation thereof, and

Figure 7 is an elevational view, partly in cross section, of the channel frame per se.

Referring to the drawings in detail, 5 designates a license plate of a form clearly shown and described in the above mentioned co-pending application. As pointed out in this application, the said license plate is provided adjacent one of its ends with a vertically disposed opening surrounding the side and bottom edges of which are guide strips 6 for slidably receiving within this opening, a removable plate 7, within which is a pocket for containing the car records. The upper end of this plate is bent inwardly to engage over the edge of the tag 5, and is formed with a horizontal tube 8. One end of the tag 5 is formed with an inwardly bent lip portion 9, having an opening therein registering with the said tube 8, the said tube and opening within the lip adapted to receive a locking pin 10, whereby the plate 7 is rigidly secured to the license tag 5. My holder per se, includes a relatively U-shaped channel frame 11, formed preferably of a single length of material and adapted for slidably receiving the said tag 5. The vertical leg 12 of the frame 11 has its upper end split, whereby the material forming this leg may be bent over to form lip portions 13, Figure 6. The front side of the vertical leg 14 of the channel frame 11 is formed with a forwardly projecting ear 15, which has an opening therein, registering with the ear 9 of the plate 5, as well as the said horizontal tube 8 of the plate 7, for also receiving the said pin 10 for obvious purposes.

After the tag 5 has been received within the channel frame, there is positioned over the top side thereof a channel retaining strip 15, one end of this retaining strip being split as at 16 and having the ends of the split portion bent inwardly to provide ears 17, which are engaged over the said ears 13 of the vertical leg 12 of the said channel frame 11. Adjacent the opposite end of the said retaining strip 15, the same is formed with a forwardly bent ear 18 having an opening registering with the openings in the ears 15 and 9, of the frame 11 and license tag 5, respectively, as well as the said tube 8 of the removable plate 7, for also receiving the pin 10, whereby the retaining strip 15' is securely locked in its position. It is desirable that the said pin 10 be mantained within the tube and the openings of the different ears through the instrumentality of a nut 9, and that the end of this pin be provided with a slot 20, through which is extended a well known form of seal 21.

In conjunction with the holder and license tag, there is provided a yearly plate 22, the lower end of the same being provided with a reversely bent portion that is engaged around the removable plate 7, it being noted that the upper end of this yearly plate is positioned between the bent over portion of the said removable plate 7, and the license tag 5. The retaining strip 15' is formed upon its inner side with a pendent channel strip 24, within which are openings 25, for permitting the same to be bolted or otherwise secured to the vehicle frame. Within the retaining strip 15', as well as the channel strip 24 is a metallic insert 26, one end of the same being bent outwardly of the retaining strip 15' for providing a plate 27, whereby the serial number of the machine motor may be impressed or otherwise formed thereon.

In view of the above description, it will at once be apparent that I have provided an effectual means for holding vehicle license tags that is of a comparatively simple and inexpensive nature, and although I have herein shown and described the preferred embodiment of the present invention, it is nevertheless to be understood that minor changes may be made therein without departing from the spirit and scope of the invention as claimed.

Having thus described my invention, what I claim as new, and desire to secure by Letters Patent is:—

1. In a holder for license tags, wherein the tag includes a removable plate having its upper end bent over the tag and provided with a horizontal tube, a relatively U-shaped channel frame, a securing strip upon the upper end of the channel frame adapted for maintaining the tag within the frame, means for retaining the securing strip upon one end of the frame, and an upwardly bent ear adjacent the opposite end of the frame having an opening therein in alinement with the said horizontal tube of the removable retaining bolt.

2. In a holder for license tags, wherein the tag includes a removable plate having its upper end bent over the tag and provided with a horizontal tube, a relatively U-shaped channel frame, a securing strip upon the upper end of the channel frame adapted for maintaining the tag within the frame, means for retaining the securing strip upon one end of the frame, and an upwardly bent ear adjacent the opposite end of the frame having an opening therein in alinement with the said horizontal tube of the removable retaining bolt, and a plate formed upon the inner surface of said securing strip whereby the holder may be bolted to a vehicle body.

3. In a license tag holder, wherein the tag is provided with a removable plate member formed with a longitudinal tube adjacent its upper end, ear members formed upon the upper end of one of the vertical legs of said U frame, a retaining strip adapted for positioning over said license tag for maintaining the same within the frame, ears formed upon one end of said strip adapted for interlocking engagement with the said ears of the frame, and a forwardly bent ear upon the opposite end of the retaining strip having an opening therein coextensive with the said horizontal tube of the removable license plate, and means between said tube and said ear for locking the strip upon the frame.

In testimony whereof I affix my signature.

LAWRENCE T. THORN.